United States Patent
Brock et al.

(10) Patent No.: US 12,535,068 B2
(45) Date of Patent: Jan. 27, 2026

(54) DURABLE VALVES FOR DISPLACEMENT PUMPS

(71) Applicant: National Oilwell Varco, L.P., Houston, TX (US)

(72) Inventors: William Bryce Brock, Houston, TX (US); Brendan Sean Young, Houston, TX (US); Mark Alan Staggs, McAlester, OK (US)

(73) Assignee: National Oilwell Varco, L.P., Houston, TX (US)

( * ) Notice: Subject to any disclaimer, the term of this patent is extended or adjusted under 35 U.S.C. 154(b) by 235 days.

(21) Appl. No.: 17/826,984

(22) Filed: May 27, 2022

(65) Prior Publication Data

US 2023/0383743 A1 Nov. 30, 2023

(51) Int. Cl.
*F04B 53/10* (2006.01)

(52) U.S. Cl.
CPC ...... *F04B 53/1075* (2013.01); *F04B 53/1087* (2013.01)

(58) Field of Classification Search
CPC .............. F04B 53/1025; F04B 53/1075; F04B 53/1087
USPC ....................................................... 251/332
See application file for complete search history.

(56) References Cited

U.S. PATENT DOCUMENTS

| | | | | | |
|---|---|---|---|---|---|
| 3,039,488 | A | * | 6/1962 | Bowerman | F16K 1/46 251/332 |
| 3,053,500 | A | * | 9/1962 | Atkinson | F16K 1/38 251/332 |
| 3,202,178 | A | * | 8/1965 | Wolfe | F16K 1/46 137/516.29 |
| 4,518,329 | A | * | 5/1985 | Weaver | F04B 53/1027 137/516.25 |
| 4,951,707 | A | * | 8/1990 | Johnson | F04B 53/1025 251/332 |
| 5,249,600 | A | * | 10/1993 | Blume | F16K 15/06 137/902 |
| 2008/0279706 | A1 | * | 11/2008 | Gambier | F04B 53/1022 251/360 |
| 2017/0298932 | A1 | * | 10/2017 | Wagner | F04B 53/1087 |
| 2020/0400140 | A1 | * | 12/2020 | Bayyouk | F16K 17/162 |
| 2023/0383743 | A1 | * | 11/2023 | Brock | F04B 53/1087 |

* cited by examiner

*Primary Examiner* — Charles G Freay
*Assistant Examiner* — Joseph S. Herrmann
(74) *Attorney, Agent, or Firm* — Conley Rose, P.C.

(57) ABSTRACT

A valve for a displacement pump includes a valve body having an annular strikeface and defining an annular receptacle, and an annular seal received in the receptacle of the valve body, the seal including an annular contact surface, wherein the seal defines a cumulative displacement ratio of (i) at least one of at most 0.20 at a location that is spaced 40% from an inner diameter (ID) of the contact surface of the seal moving towards an outer diameter (OD) of the contact surface, (ii) at most 0.35 at a location that is spaced 55% from the ID of the contact surface moving towards the OD of the contact surface, and (iii) at most 0.45 at a location that is spaced 65% from the ID of the contact surface moving towards the OD of the contact surface.

20 Claims, 5 Drawing Sheets

DURABLE VALVES FOR DISPLACEMENT PUMPS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Displacement pumps are utilized in a variety of applications for transporting fluid by enclosing a fixed volume of fluid and mechanically transporting the enclosed volume through the displacement pump. Well service pumps, but one type of displacement pump, are used in the oil and gas industry to pump fluids down a well for various purposes. For example, one common use of well service pumps is in hydraulic fracturing of subterranean earthen formations. Particularly, well service pumps may pump a high-pressure fluid containing solids into a wellbore extending through an earthen formation whereby the pumped high-pressure fluid may expand fractures formed in the earthen formation.

Well service pumps are commonly plunger pumps, which are a type of reciprocating positive displacement pump. In these pumps, a plunger reciprocates axially in a fluid end of the pump, with a packing retained between the fluid end and the plunger preventing leakage during the reciprocating motion of the plunger. Plunger pumps often use a crank mechanism to provide the reciprocating motion of the plunger. The crank mechanism typically includes an extension rod that is rigidly attached to a crosshead that is constrained to move axially by the frame of the pump. The crosshead is coupled to an eccentric crankshaft via a wrist pin and connecting rod. As the crankshaft rotates, the connecting rod transfers this motion to the crosshead. Because the crosshead is constrained to move axially, the rotational motion will be converted into reciprocating motion, which is transferred to the plunger via the extension rod. Additionally, the fluid end of well service pumps, including plunger pumps, include a valve-over-valve arrangement in which suction and discharge valves of the pump are positioned vertically, one valve above the other, and perpendicular to an intersecting plunger bore.

BRIEF SUMMARY OF THE DISCLOSURE

An embodiment of a valve for a displacement pump comprises a valve body having an annular strikeface and defining an annular receptacle, and an annular seal received in the receptacle of the valve body, the seal comprising an annular contact surface whereby the strikeface of the valve body and the contact surface of the seal define an annular contact shoulder of the valve configured to contact a valve seat of the displacement pump when the valve is in a closed position, wherein the seal defines a cumulative displacement ratio of (i) at least one of at most 0.20 at a location that is spaced 40% from an inner diameter (ID) of the contact surface of the seal moving towards an outer diameter (OD) of the contact surface, (ii) at most 0.35 at a location that is spaced 55% from the ID of the contact surface moving towards the OD of the contact surface, and (iii) at most 0.45 at a location that is spaced 65% from the ID of the contact surface moving towards the OD of the contact surface. In some embodiments, the seal defines the cumulative displacement ratio of at most 0.20 at the location that is spaced 40% from the ID of the contact surface moving towards the OD of the contact surface, at most 0.35 at the location that is spaced 55% from the ID of the contact surface moving towards the OD of the contact surface, and at most 0.45 at the location that is spaced 65% from the ID of the contact surface moving towards the OD of the contact surface. In some embodiments, wherein the seal defines a cumulative displacement ratio of at most 0.30 at a location that is spaced 50% from the ID of the contact surface moving towards the OD of the contact surface. In certain embodiments, the seal defines a cumulative displacement ratio of at most 0.35 at the location that is spaced 55% from the ID of the contact surface moving towards the OD of the contact surface. In certain embodiments, the seal has an integrated cumulative displacement ratio of 0.31 or less. In some embodiments, the contact surface of the seal comprises an annular radially inner frustoconical surface extending radially outwards from the ID of the contact surface, a radially outer annular convex surface extending radially inwards from the OD of the contact surface, and an annular concave interface positioned between the frustoconical surface and the convex surface.

An embodiment of a valve for a displacement pump comprises a valve body having an annular strikeface and defining an annular receptacle, and an annular seal received in the receptacle of the valve body, the seal comprising an annular contact surface whereby the strikeface of the valve body and the contact surface of the seal define an annular contact shoulder of the valve configured to contact a valve seat of the displacement pump when the valve is in a closed position, wherein the seal has an integrated cumulative displacement ratio of 0.31 or less. In some embodiments, the seal has an integrated cumulative displacement ratio of 0.26 or less. In some embodiments, the seal has an integrated cumulative displacement ratio of 0.21 or less. In certain embodiments, the seal defines a cumulative displacement ratio of (i) at least one of at most 0.20 at a location that is spaced 40% from an inner diameter (ID) of the contact surface of the seal moving towards an outer diameter (OD) of the contact surface, (ii) at most 0.35 at a location that is spaced 55% from the ID of the contact surface moving towards the OD of the contact surface, and (iii) at most 0.45 at a location that is spaced 65% from the ID of the contact surface moving towards the OD of the contact surface. In certain embodiments, the seal defines the cumulative displacement ratio of at most 0.20 at the location that is spaced 40% from the ID of the contact surface moving towards the OD of the contact surface, at most 0.35 at the location that is spaced 55% from the ID of the contact surface moving towards the OD of the contact surface, and at most 0.45 at the location that is spaced 65% from the ID of the contact surface moving towards the OD of the contact surface. In some embodiments, the contact surface of the seal comprises an annular radially inner frustoconical surface extending radially outwards from an inner diameter (ID) of the contact surface, a radially outer annular convex surface extending radially inwards from an outer diameter (OD) of the contact surface, and an annular concave interface positioned between the frustoconical surface and the convex surface.

An embodiment of a valve for a displacement pump comprises a valve body having an annular strikeface and defining an annular receptacle, and an annular seal received in the receptacle of the valve body, the seal comprising an annular contact surface whereby the strikeface of the valve body and the contact surface of the seal define an annular contact shoulder of the valve configured to contact a valve seat of the displacement pump when the valve is in a closed position, wherein the contact surface of the seal extends between an inner diameter (ID) and an outer diameter (OD) and comprises an annular radially inner frustoconical surface extending radially outwards from the ID of the contact surface, a radially outer annular convex surface extending radially inwards from the OD of the contact surface, and an annular concave interface positioned between the frustoconical surface and the convex surface. In some embodiments, the strikeface of the valve body extends at a first angle to a horizontal that extends normally relative to a central axis of the valve, and the frustoconical surface extends at a second angle from the horizontal that is less than the first angle. In some embodiments, the seal defines a cumulative displacement ratio of (i) at least one of at most 0.20 at a location that is spaced 40% from the ID of the contact surface of the seal moving towards the OD of the contact surface, (ii) at most 0.35 at a location that is spaced 55% from the ID of the contact surface moving towards the OD of the contact surface, and (iii) at most 0.45 at a location that is spaced 65% from the ID of the contact surface moving towards the OD of the contact surface. In certain embodiments, the seal defines the cumulative displacement ratio of at most 0.20 at the location that is spaced 40% from the ID of the contact surface moving towards the OD of the contact surface, at most 0.35 at the location that is spaced 55% from the ID of the contact surface moving towards the OD of the contact surface; and at most 0.45 at the location that is spaced 65% from the ID of the contact surface moving towards the OD of the contact surface. In certain embodiments, the seal has an integrated cumulative displacement ratio of 0.31 or less.

BRIEF DESCRIPTION OF THE DRAWINGS

For a detailed description of exemplary embodiments of the disclosure, reference will now be made to the accompanying drawings in which.

DETAILED DESCRIPTION

Figure 1:
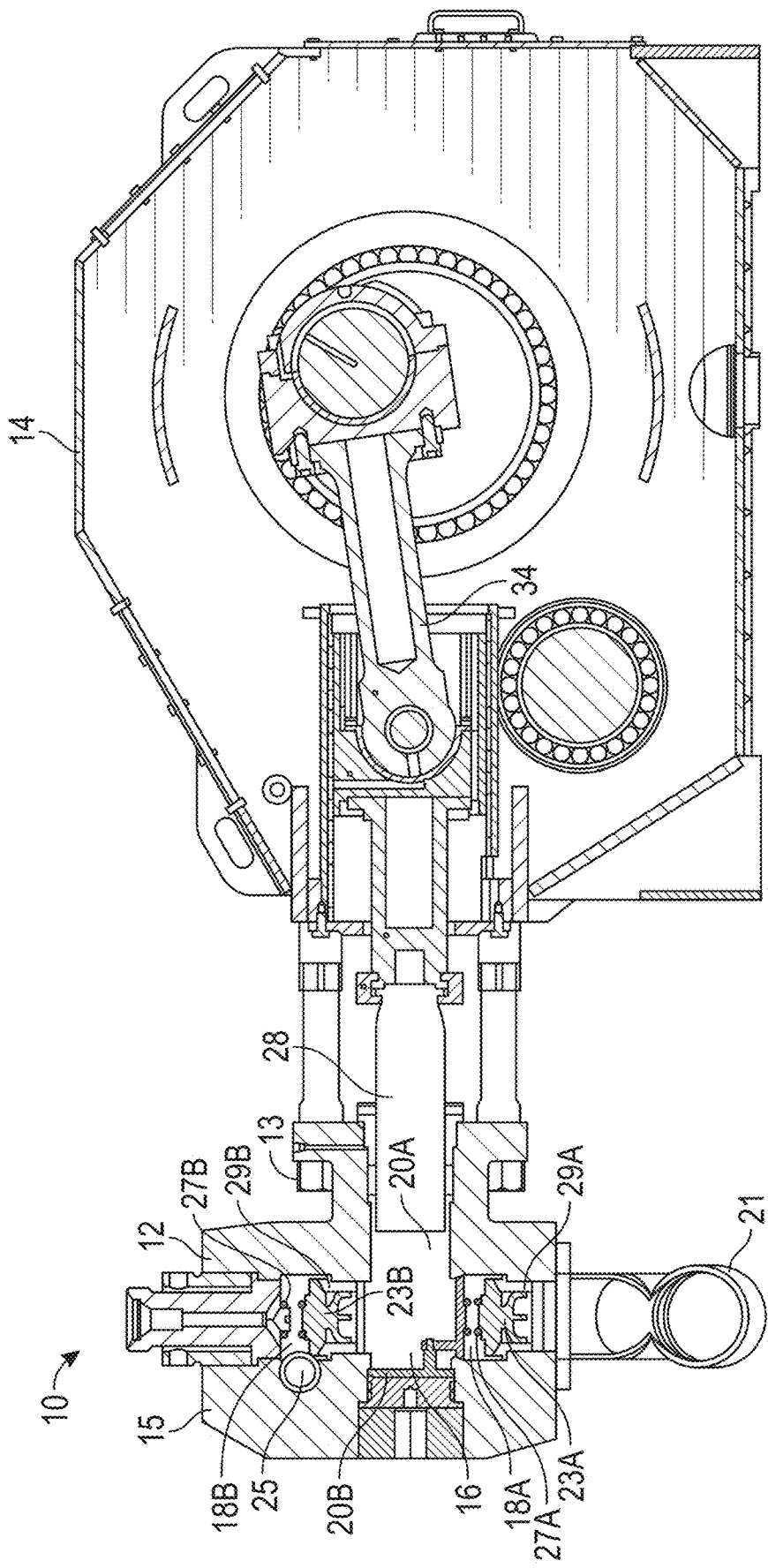
FIG. 1 is a side cross-sectional view of an embodiment of a displacement pump.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct engagement between the two devices, or through an indirect connection that is established via other intermediate devices, components, nodes, and connections. In addition, as used herein, the terms "axial" and "axially" generally mean along or parallel to a particular axis (for example central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (plus or minus 10%) of the recited value. Thus, for example, a recited angle of "about 80 degrees" refers to an angle ranging from 72 degrees to 88 degrees.

As previously described, displacement pumps such as well service pumps include a fluid end having a suction valve and a discharge valve disposed in a valve-over-valve arrangement. The suction valve of the displacement pump may seat against a suction valve seat when in a closed position restricting fluid flow through a suction of the displacement pump. Similarly, the discharge valve of the displacement pump may seat against a discharge valve seat when in a closed position restricting flow through a discharge of the displacement pump. Each of the suction valve and the discharge valve may include a valve body having an annular strikeface and an annular elastomeric seal connected to the valve body, the elastomeric seal having a contact surface.

The strikeface of the valve body and the contact surface of a given valve of a displacement pump are each configured to land and seat against the corresponding valve seat of the pump when the valve is in a closed position. The seal, being of a pliable material, may cushion the impact between the strikeface of the valve body and the valve seat. Particularly, a portion of the volume of the seal is displaced in response to contact between the contact surface of the seal and the valve seat. Displacement of the seal may damage the seal gradually degrading the performance of the seal until the seal (or the entire valve) must be replaced. Specifically, the portion of the displacement volume located at or near an inner diameter (ID) of the contact surface must flow a great distance radially outwards towards an outer diameter (OD) of the contact surface in response to contact between the seal and the valve seat, producing a substantial amount of heat, stress, and corresponding strain in the radially inner portion of the displacement volume.

Additionally, during the operational life of the displacement pump, the strikeface of the valve body may gradually wear in response to repeated contact between the strikeface and the valve seat. Wear to the strikeface exacerbates the elevated levels of heat, stress, and strain subjected to the radially inner portion of the displacement volume of the seal, accelerating the wear occurring to the seal and thereby reducing the operational life of the seal. These issues may of course be aggravated by operating the displacement pump at elevated pressures and temperatures in order to achieve a desired discharge pressure.

Accordingly, embodiments of durable valves for displacement pumps such as well service pumps are disclosed herein. Particularly, embodiments of durable valves are disclosed herein which include an annular seal configured to decrease the amount of displacement volume of the seal located at or near the ID of a contact surface of the seal. The displacement volume of the seal is instead shifted towards the OD of the contact surface where the heat, stress, and strain subjected to the displacement volume is less severe than that subjected to the radially inner portion of the displacement volume. By minimizing the amount of displacement volume at or near the ID of the contact surface (while leaving enough displacement volume to cushion the impact of the strikeface against the valve seat) the degree of heat, stress, and strain experienced by the seal during operation may be minimized, thereby maximizing the operational life of the seal.

In some embodiments, the radially outwards shift of the displacement volume is at least partially accomplished through the geometry of the contact surface of the seal. For example, the contact surface of the seal may include a radially inner frustoconical surface, a radially outer convex surface, and a concave interface formed between the inner frustoconical surface and the outer convex surface.

Referring to FIG. 1, a displacement pump 10 is shown. In this exemplary embodiment, displacement pump 10 is well service pump having internal plungers 28, and thus is referred to as a plunger pump 10; however, in other embodiments, pump 10 may comprise other types of displacement pumps known in the art such as drilling pumps, mining pumps, and pumps utilized in other industrial applications. In this exemplary embodiment, well service pump 10 generally includes a fluid end 12 and a power end 14 coupled to a fluid end 12 via a plurality of stray rods or fasteners 13.

The fluid end 12 of well service pump 10 includes a fluid end housing 15 which comprises a fluid chamber 16, a suction bore 18A, a discharge bore 18B, a plunger bore 20A, and an access bore 20B, each of which intersect fluid chamber 16. In this exemplary embodiment, suction bore 18A and discharge bore 18B of fluid end housing 15 are opposed and axially aligned along a common longitudinal axis. Suction bore 18A of fluid end housing 15 is in selective fluid communication with a suction manifold 21 via a suction valve 23A of fluid end 12. Similarly, the discharge bore 18B of fluid end housing 15 is in selective fluid communication with a discharge port 25 via a discharge valve 23B of fluid end 12. Fluid end 12 of well service pump 10 additionally includes a suction valve seat 29A positioned in suction bore 18A of fluid end housing 15 and a discharge valve seat 29B positioned in the discharge bore 18B of fluid end housing 15. In some embodiments, discharge valve seat 29B may be coupled to fluid end housing 15 via frictional contact, an interference fit, a connector positioned on discharge valve seat 29B, and/or via a separate retainer used to fasten discharge valve seat 29B with fluid end housing 15. In some embodiments, suction valve seat 29A may be coupled to fluid end housing 15 via frictional contact, an interference fit, a connector positioned on suction valve seat 29A, and/or via a separate retainer used to fasten suction valve seat 29A with fluid end housing 15.

Suction valve 23A of fluid end 12 is biased into engagement or contact with suction valve seat 29A via a suction biasing member 27A while discharge valve 23B is biased into engagement or contact with discharge valve seat 29B via a discharge biasing member 27B. When suction valve 23A is in contact with suction valve seat 29A, fluid communication is restricted between suction manifold 21 and the fluid chamber 16 of fluid end housing 15. Similarly, fluid communication is restricted between discharge port 25 and fluid chamber 16 when discharge valve 23B contacts discharge valve seat 29B.

In this embodiment, well service pump 10 additionally includes a plunger 28 slidably positioned in plunger bore 20A. Plunger 28 may reciprocate into and out of the fluid chamber 16 in response to the actuation of a crank mechanism 34 of the power end 14 of well service pump 10. During a suction stroke of plunger 28, plunger 28 is withdrawn from the fluid chamber 16 into the plunger bore 20A, thereby drawing fluid from the suction manifold 21, through suction valve 23A, and into fluid chamber 16 of fluid end housing 15. During the suction stroke of plunger 28, the suction valve 23A is lifted off the suction valve seat 29A when the force of the fluid from the fluid chamber 16 overcomes the force of suction biasing member 27A. Fluid flows into fluid chamber 16 from suction manifold 21 in response to the suction valve 23A being lifted from the suction valve seat 29A.

During a discharge stroke of plunger 28, plunger 28 displaces or extends from the plunger bore 20A into fluid chamber 16, whereby plunger 28 forces fluid in fluid chamber 16 through discharge valve 23B and into the discharge port 25 of fluid end housing 15. During the discharge stroke of plunger 28, the discharge valve 23B is lifted off the discharge valve seat 29B when the force of the fluid from the fluid chamber 16 overcomes the force of discharge biasing member 27B. Fluid flows into discharge port 25 from fluid chamber 16 in response to the discharge valve 23B being lifted from the discharge valve seat 29B.

Figure 2:
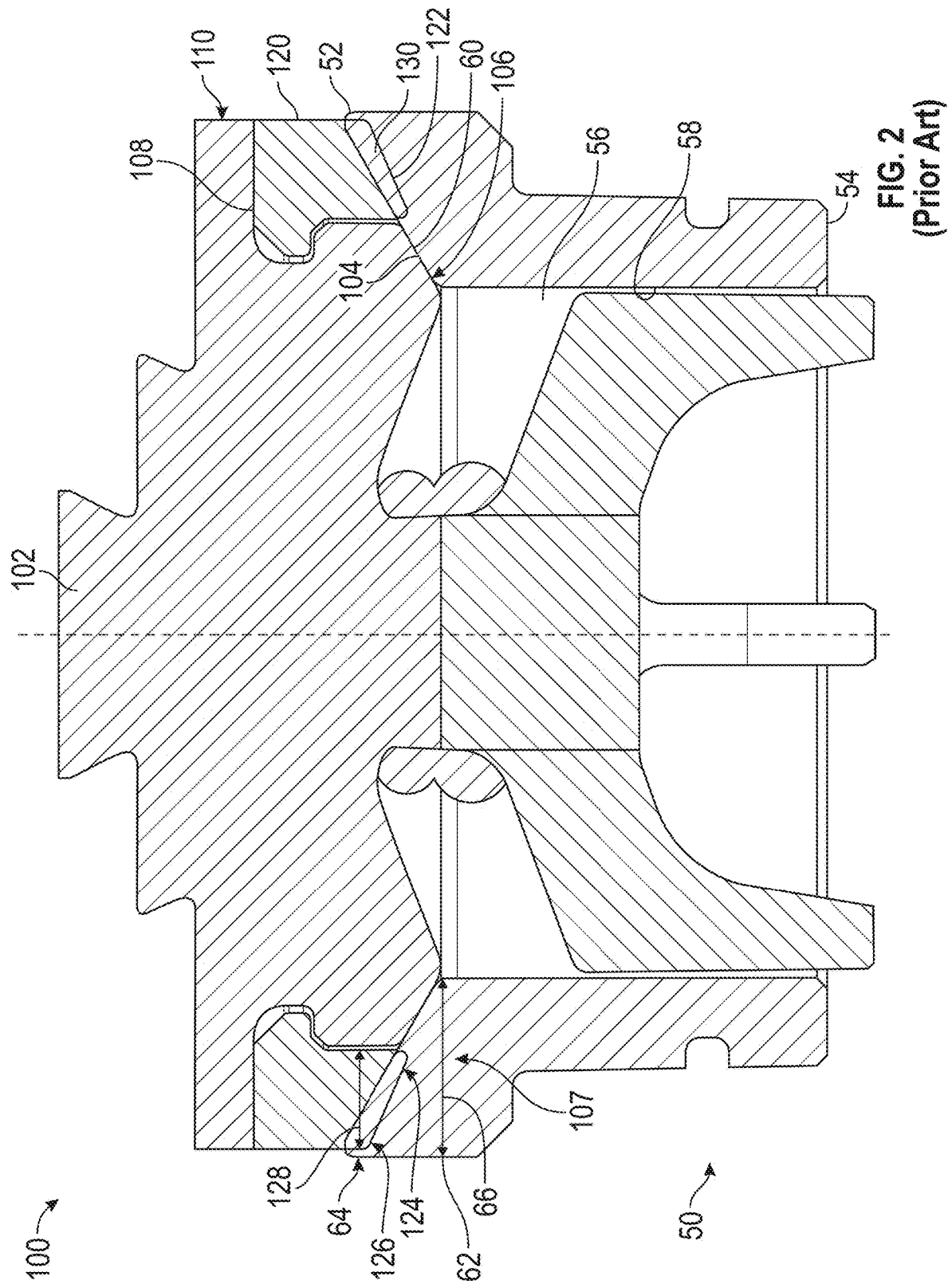
FIG. 2 is a side cross-sectional view of a conventional valve for a displacement pump.

Referring to FIG. 2, a valve seat 50 and a conventional valve 100 for a displacement pump such as the well service pump 10 of FIG. 1 is shown. In some embodiments, the suction valve seat 29A or the discharge valve seat 29B may comprise the valve seat 50 shown in FIG. 2. In this exemplary embodiment, valve seat 50 has a first end 52, a second end 54 longitudinally opposite first end 52, and a central bore or passage 56 defined by a generally cylindrical inner surface 58 extending between ends 52 and 54. Additionally, valve seat 50 defines an annular seating surface 60 that is located proximate the first end 52 of valve seat 50. Particularly, the seating surface 60 extends radially between an inner diameter (ID) 62 of the seating surface 60 and an outer diameter (OD) 64 of the seating surface 60. Additionally, a seat radius 66 is defined by the seating surface 60 and which extends annularly between the ID 62 and OD 64 of the seating surface 60.

Conventional valve 100 generally includes a valve body 102 and an annular insert or seal 120 connected to the valve body 102. Particularly, valve body 102 of conventional valve 100 includes an annular strikeface 104 extending radially outwards from an ID 106 of the valve body 102, and an annular receptacle 108 extending radially inwards into the valve body 102 from an OD 110 thereof. Seal 120 is formed from a pliable material such as an elastomeric material and defines an annular contact surface 122 which extends radially between an ID 124 of the contact surface 122 and an OD 126 of the contact surface 122. In this example, the OD 126 of contact surface 122 is comparable to the OD 110 of valve body 102; however, it may be understood that in other instances the OD of a given valve body may vary from the OD of the contact surface. For example, 100 may be overmolded such that OD 110 of valve body 102 is greater than the OD 126 of contact surface 122. Additionally, the contact surface 122 of the seal 120 defines seal radius 128 which extends annularly between the ID 124 and OD 126 of the contact surface 122. Contact surface 122 is planar extending at a fixed, inclined angle between the ID 124 and the OD 126 thereof. However, it may be understood that the geometry of the contact surface 122 of seal 120 may vary.

The contact surface 122 of seal 120 is the portion of the exterior surface of seal 120 which contacts the seating surface 60 of the valve seat 50 when the valve 100 is in a closed position with respect to the valve seat 50 as shown in FIG. 2. Thus, an entirety of the contact surface 122 of seal 120 falls within the seating radius 66 defined by the seating surface 60. In other words, the ID 124 of contact surface 122 is greater than the ID 62 of seating surface 60 while the OD 126 of contact surface 122 is less than the OD 64 of seating surface 60. The contact surface 122 of the seal 120 and the strikeface 104 of the valve body 102 of valve 100 collectively form or define a contact shoulder 107 of the valve 100.

A portion of the volume of the seal 120 of conventional valve 100 is displaced in response to contact between the contact surface 122 of seal 120 and the seating surface 60. As shown particularly in FIG. 2, a portion of the seal 120, referred to herein as the displacement volume 130, enters into interference with valve seat 50 such that an entirety of the displacement volume 130 must displace or flow away from its original or rest position (corresponding to an open position of conventional valve 100) to a second or displaced position (corresponding to a closed position of conventional valve 100) to thereby permit the strikeface 104 of valve 100 to contact the seating surface 60 of valve seat 50. FIG. 2 shows displacement volume 130 in its rest position in interference with valve seat 50 and thus is not an accurate representation of how the displacement volume 130 flows into its displaced position response to contact between the contact surface 122 of seal 120 and the seating surface 60 of valve seat 50. Although not shown in FIG. 2, it may be understood that the displacement volume 130 of seal 120 flows radially outwards in the direction of the OD 126 of contact surface 122 when displacement volume 130 is displaced from its rest position to its displaced position.

FIG. 2 is meant to illustrate the geometry of displacement volume 130 with seal 120 in an undisturbed state. Particularly, the contact surface 122 of seal 120 in this example is planar in shape and extends at an acute angle relative to the angle (relative to the horizontal) from which strikeface 104 of the valve body 102 extends. However, it may be understood that the geometry of the contact surface 122 of conventional seals like seal 120 may vary somewhat in shape. As shown in FIG. 2, in the rest position the displacement volume 130 of seal 120 extends substantially if not entirely between the ID 124 and the OD 126 of the contact surface 122. In this configuration, the elastomeric material comprising seal 120 must be displaced or flow across substantially the entire radius of seal 120 beginning at ID 124 of contact surface 122. In other words, a substantial volume of the elastomeric material comprising seal 120 is displaced in response to the seal 120 shifting between the rest and displaced positions. The displacement volume 130 of seal 120 therefore repeatedly undergoes a high degree of stress and strain each time conventional valve 100 is shifted from the open position to the closed position.

Additionally, given that the displacement volume 130 extends at least substantially to the ID 124 of the contact surface 122, the portion of the displacement volume 130 located proximal to the ID 124 of contact surface 122 may be displaced a greater distance in response to seal 120 shifting into the displaced position than the portion of displacement volume 130 located proximal to the OD 126 of contact surface 122. Thus, a radially inner half of displacement volume 130 (the portion of seal 120 extending radially between ID 124 and a midway point or middle of seal radius 128) may experience a greater degree of stress and strain than a radially outer half (the portion of seal 120 extending radially between OD 126 and the midway point of seal radius 128) of displacement volume 130. The repeated elevated stress and strain experienced by the radially inner half of displacement volume 130 may result in advanced fatigue and deterioration of the radially inner half of displacement volume 130 relatively early in the operational life of seal 120, potentially inhibiting the seal 120 from effectively sealing the annular interface formed between valve seat 50 and conventional valve 100. This deterioration of the radially inner half of displacement volume 130 may be accelerated in some instances by the normal wear that occurs to the strikeface 104 of valve body 102 during the operation of conventional valve 100.

Figure 3:
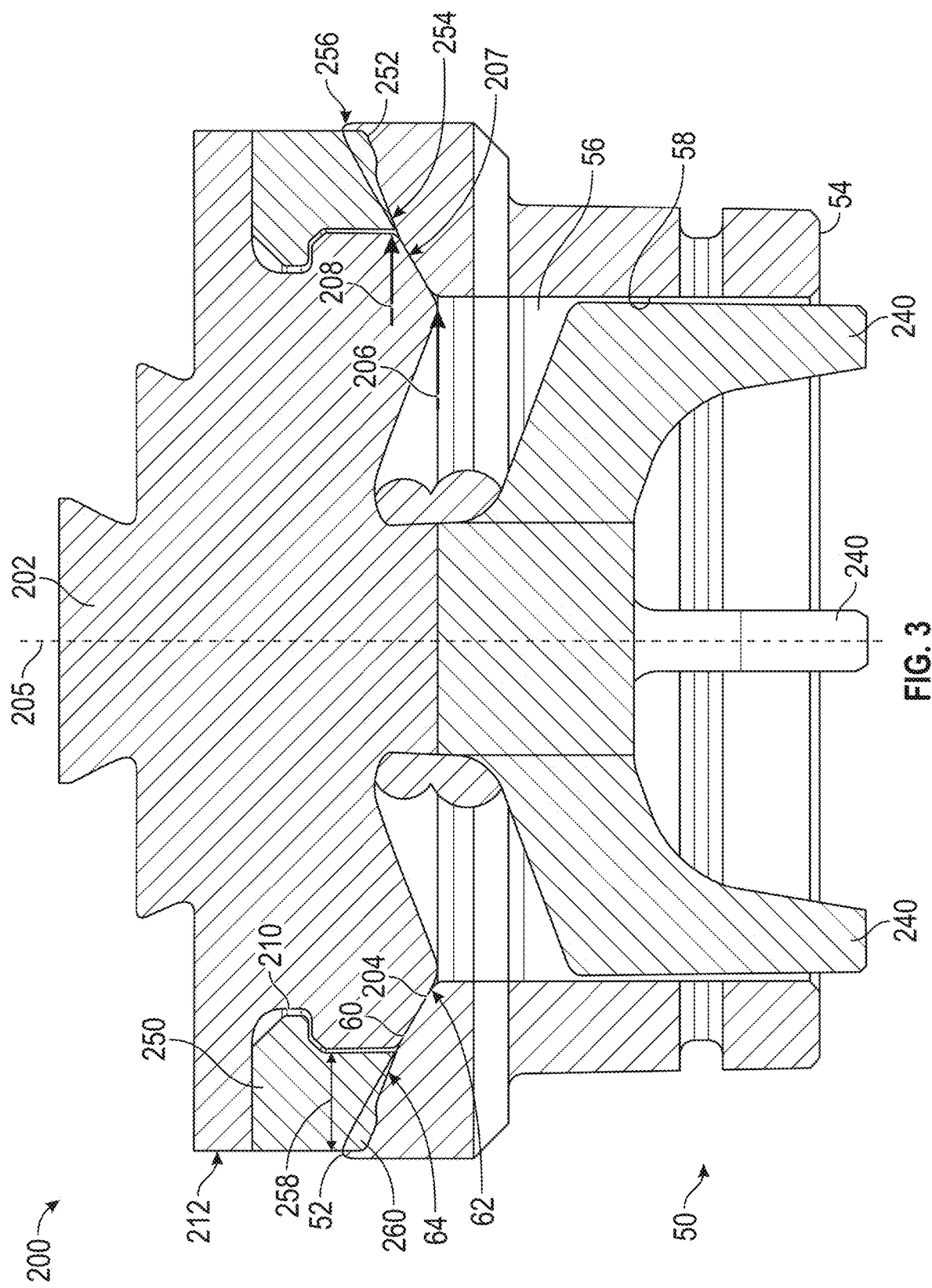
FIG. 3 is a side cross-sectional view of an embodiment of a durable valve for a displacement pump.

Referring now to FIG. 3, an embodiment of a durable valve 200 for a displacement pump having a central or longitudinal axis 205 and generally including a valve body 202 and an annular durable seal 250 is shown. As an example, the durable valve 200 shown in FIG. 3 may comprise the suction valve 23A or discharge valve 23B of the displacement pump 10 shown in FIG. 1. As will be described further herein, durable seal 250 is configured to minimize the size of the radially inner half of a displacement volume 260 of the durable seal 250.

In this exemplary embodiment, valve body 202 of durable valve 200 includes an annular strikeface 204 extending radially between an ID 206 and an OD 208. Additionally, an outer surface of the valve body 202 defines an annular receptacle 210 which receives at least a portion of the durable seal 250 and extends radially outwards to an OD 212 of the valve body 202. In this exemplary embodiment, valve body 202 is coupled to a plurality of wings 240 which extend through the central passage 56 of valve seat 50 to centralize the durable valve 200 with respect to the valve seat 50. However, it may be understood that in other embodiments the valve body 202 may not be connected to (or comprise itself) the wings 240 shown in FIG. 3.

Durable seal 250 of durable valve 200 is formed from a pliable material such as an elastomeric material and defines an annular contact surface 252 extending radially between an ID 254 of the contact surface 252 and an OD 256 of the contact surface 252. Additionally, the contact surface 252 of the durable seal 250 defines a seal radius 258 which extends annularly between the ID 254 and OD 256 of the contact surface 252. The geometry of the contact surface 252 of durable seal 250 will be described further herein. The contact surface 252 of the seal 250 and the strikeface 204 of the valve body 202 of durable valve 200 collectively form or define a contact shoulder 207 of the durable valve 200.

As with the contact surface 122 of seal 120 shown in FIG. 2, the contact surface 252 of durable seal 250 shown in FIG. 3 is the portion of the exterior surface of durable seal 250 which contacts the seating surface 60 of the valve seat 50 when the durable valve 200 is in a closed position with respect to the valve seat 50 as shown in FIG. 3. Thus, in this exemplary embodiment, an entirety of the contact surface 252 of durable seal 250 falls within the seating radius 66 defined by the seating surface 60. In other words, the ID 254 of contact surface 252 is greater than the ID 62 of seating surface 60 while the OD 256 of contact surface 252 is less than the OD 64 of seating surface 60.

Also as with the seal 120 shown in FIG. 2, a portion of the volume of the durable seal 250 of the durable valve 200 shown in FIG. 3 is displaced in response to contact between the contact surface 252 of durable seal 250 and the seating surface 60 of valve seat 50. Particularly, a displacement volume 260 of durable seal 250 enters into interference with valve seat 50 such that an entirety of the displacement volume 260 must displace or flow away from its original or rest position to a second or displaced position spaced from the rest position to thereby permit the strikeface 204 of valve body 202 to contact the seating surface 60 of valve seat 50. FIG. 3 shows displacement volume 260 in its rest position in interference with valve seat 50 and thus is not an accurate representation of how displacement volume 260 flows into its displaced position in response to contact with the seating surface 60 of valve seat 50.

Unlike the displacement volume 130 of seal 120 shown in FIG. 2, the radially inner half of displacement volume 260 (the portion of displacement volume 260 extending between ID 254 and a midway point or middle of seal radius 258) is minimized in size relative to the radially outer half of displacement volume 260 (the portion of displacement volume 260 extending between OD 256 and the midway point of seal radius 258). In this configuration, the radially inner half of displacement volume 260 is substantially smaller than the radially outer half of displacement volume 260. By minimizing the mount of displacement volume 260 located near ID 254 of contact surface 252, the total amount of flow or displacement of the displacement volume 260 resulting from the shifting of displacement volume 260 between the rest and displaced positions is minimized given that less elastomeric material of the seal 250 must flow radially outwards from the ID 254 of contact surface 252. By minimizing the total amount of displacement that occurs to displacement volume 260 as volume shifts between the rest and displaced positions, the amount of stress and strain to which the displacement volume 260, and particularly the radially inner half of volume 260, is exposed may in-turn be minimized, maximizing the operational life of the durable seal 250 even as the strikeface 204 of valve body 202 begins to wear thereby applying greater stress and strain to the radially inner half of displacement volume 260.

Figure 4:
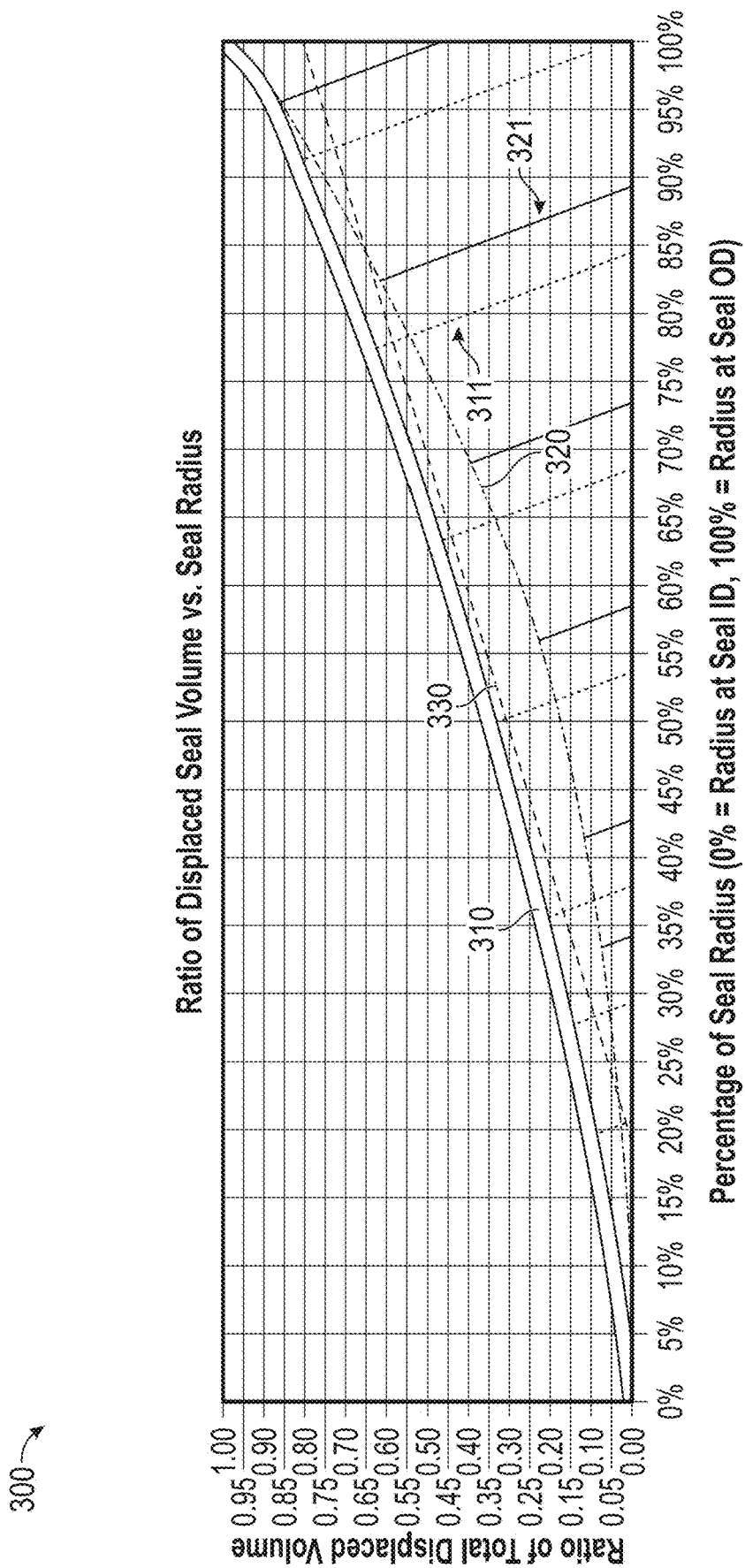
FIG. 4 is a graph showing cumulative displacement ratios of the conventional valve of FIG. 2 and the durable valve of FIG. 3 as a function of radial location.

Referring to FIGS. 2-4, a graph 300 is shown in FIG. 4 showing cumulative displacement ratios of several valves for the seals of displacement pumps as a function of radial location. Particularly, graph 300 compares a first cumulative ratio of displaced seal volume 310 corresponding to the seal 120 shown in FIG. 2 with a second cumulative ratio of displaced seal volume 320 corresponding to the durable seal 250 shown in FIG. 3. Particularly, graph 300 illustrates a ratio of displaced seal volume for each seal 120 and 250 as a function of the seal radius 128, 258 for the given seal 120, 250. For example, first cumulative displacement ratio 310 of graph 300 illustrates that at approximately 32% between ID 124 and OD 126 of contact surface 122 the first cumulative displacement ratio 310 of displacement volume 130 is approximately 0.20, while at approximately 72% between ID 124 and OD 126 of contact surface 122 the first cumulative displacement ratio 310 of displacement volume 130 is approximately 0.60. As an example, if the ID 124 is equal to 5.00 inches (in) and the OD 126 is equal to 6.00 in, then 32% from the ID 124 to the OD 126 of contact surface 122 would equal approximately 5.32 in while 72% from the ID 124 to the OD 126 of contact surface 122 would equal approximately 5.72 in. Additionally, if the displacement volume 130 is equal to 0.50 cubic inches ($in^3$) then the first cumulative displacement ratio 310 at 32% from the ID 124 would equal approximately 0.10 $in^3$, while the first cumulative displacement ratio 310 at 72% from the ID 124 would equal approximately 0.30 $in^3$.

Graph 300 illustrates how the radially inner half of the displacement volume 260 of durable seal 250 is substantially less than the radially outer half of displacement volume 260 such that a majority of the displacement volume 260 has been positioned along the radially outer half of volume 260. For example, at 50% from the ID 254 of contact surface 252 (the midway point between ID 254 and OD 256) the second cumulative displacement ratio 320 is equal to only approximately 0.18. In other words, less than 20% of the displacement volume 260 of durable seal 250 is located between the ID 254 and the radial midway point between ID 254 and OD 256 of contact surface 252, while over 80% of the displacement volume 260 of durable seal 250 is located between the midway point and OD 256 of contact surface 252. Thus, little of the displacement volume 260 of durable seal 250 is forced to flow or displace from the radially inner half thereof towards the OD 256 in response to shifting of the displacement volume 260 from the rest position to the displaced position, thereby minimizing the amount of stress and strain experienced by the displacement volume 260 as durable seal 250 shifts between the rest and displaced positions. Conversely, at 50% of the ID 124 of the contact surface 122 of seal 120 the first cumulative displacement ratio 310 is equal to approximately 0.35. Thus, a substantially larger share of displacement volume 130 resides between ID 124 and the midway point of seal radius 128, resulting in a relatively greater amount of stress and strain experienced by the displacement volume 130 of conventional seal 120 as the volume 130 is shifted between rest and displaced positions. While it may be understood that the geometry of the displacement volume of conventional seals may vary to a degree, the cumulative displacement ratio of conventional seals increases much more rapidly for conventional seals moving away from the ID thereof as compared to the second cumulative displacement ratio 320 of durable seal 250 moving radially outwards from the ID 254 thereof. The reduced cumulative displacement ratio along the radially inner half of displacement volume 260 reduces wear of durable seal 250 along the ID 254 of contact surface 252, thereby maximizing the operational life of valve 200 as the strikeface 204 of valve body 202 wears away subjecting the ID 254 to greater-and-greater stress and strain.

It may be understood that the ratio of displaced seal volume as a function of seal radius of the durable seal 250 shown in FIG. 3 may vary from the second cumulative displacement ratio 320 shown in graph 300. For example, in some embodiments, at most 75% of the displacement volume 260 of durable seal 250 is displaced at a location 90% from the ID 254 (the ratio at 90% from ID 254 is at most 0.75) when the displacement volume 260 is in the displaced position. In some embodiments, at most 65% of the displacement volume 260 of durable seal 250 is displaced at a location 80% from the ID 254 when the displacement volume 260 is in the displaced position. In certain embodiments, at most 55% of the displacement volume 260 of durable seal 250 is displaced at a location 75% from the ID 254 the displacement volume 260 is in the displaced position. In some embodiments, at most 50% of the displacement volume 260 of durable seal 250 is displaced at a location 70% from the ID 254 when the displacement volume 260 is in the displaced position. In some embodiments, at most 45% of the displacement volume 260 of durable seal 250 is displaced at a location 65% from the ID 254 the displacement volume 260 is in the displaced position. In some embodiments, at most 40% of the displacement volume 260 of durable seal 250 is displaced at a location 60% from the ID 254 when the displacement volume 260 is in the displaced position. In certain embodiments, at most 35% of the displacement volume 260 of durable seal 250 is displaced at a location 55% from the ID 254 when the displacement volume 260 is in the displaced position. In certain embodiments, at most 30% of the displacement volume 260 of durable seal 250 is displaced at a location 50% from the ID 254 when the displacement volume 260 is in the displaced position. In certain embodiments, at most 25% of the displacement volume 260 of durable seal 250 is displaced at a location 45% from the ID 254 the displacement volume 260 is in the displaced position. In certain embodiments, at most 20% of the displacement volume 260 of durable seal 250 is displaced at a location 40% from the ID 254 the displacement volume 260 is in the displaced position. In certain embodiments, at most 15% of the displacement volume 260 of durable seal 250 is displaced at a location 35% from the ID 254 the displacement volume 260 is in the displaced position. In some embodiments, at most 10% of the displacement volume 260 of durable seal 250 is displaced at a location 30% from the ID 254 the displacement volume 260 is in the displaced position. In certain embodiments, at most 55% of the displacement volume 260 of durable seal 250 is displaced at a location 75% from the ID 254 the displacement volume 260 is in the displaced position.

The cumulative displacement ratio of durable seal 250 as a function of seal radius (moving from the ID 254 of contact surface 252 to the OD 256 thereof) may be expressed as a curve fit. Particularly, in some embodiments, the portion of the cumulative displacement ratio of durable seal 250 extending from the ID 254 to 70% from the ID 254 is expressible as a linear curve fit having a slope of approximately between 0.98 and 0.99 and a Y-intercept of approximately between −0.10 and −0.2. For example, a linear curve fit 330 is shown in FIG. 4 of a portion of the second cumulative ratio of displaced seal volume 320 extending between ID 254 and a location spaced 70% from the ID 254. In other words, linear curve fit 330 is formed from the points of the second cumulative ratio of displaced seal volume 320 located inclusively between 0% and 70% of the percentage of the seal radius shown along the X-axis of graph 300. In this exemplary embodiment, linear curve fit 330 has a slope of 1.00; however, it may be understood that in other embodiments the slope of linear curve fit 330 may vary. For example, in some embodiments, the slope of linear curve fit 330 is equal to or less than 0.99. In still other embodiments, the slope of linear curve fit 330 is equal to or less than 0.98. In certain embodiments, the Y-intercept of linear curve fit is between −0.10 and −0.50. In certain embodiments, the Y-intercept of linear curve fit is between −0.15 and −0.30.

The cumulative displacement ratio of durable seal 250 (and for other seals) may be integrated across the diameter of the seal to provide an integrated cumulative displacement ratio. For example, the cumulative ratio of displaced seal volume 320 may be integrated across the interval extending from the ID 254 to the OD 256 of durable seal whereby durable seal 250 has an integrated cumulative displacement ratio (indicated by arrow 321 in FIG. 4) that is equal to 0.31 or less. In other words, the area under the curve defined by the cumulative ratio of displaced seal volume 320 across the interval extending entirely from ID 254 to OD 256 is a value equal to 0.31 or less. In some embodiments, the integrated cumulative displacement ratio 321 of durable seal 250 is 0.26 or less. In some embodiments, displacement ratio 321 of durable seal 250 is 0.21 or less. In certain embodiments, displacement ratio 321 of durable seal 250 is 0.16 or less.

Seal 120 similarly has an integrated cumulative displacement ratio (indicated by arrow 311 in FIG. 4) across the interval from ID 124 to OD 126 that is greater than 0.31. Thus, as used herein, the term "integrated cumulative displacement ratio" is defined as the integrated cumulative ratio of displaced seal volume entirely across a diameter of an annular contact surface of the seal which extends from an ID of the annular contact surface to an OD of the annular contact surface. Durable seal 250 has a smaller integrated cumulative displacement ratio 321 than convention seal 120 (integrated cumulative displacement ratio 311) given that a greater amount of the volume of durable seal 250 is concentrated near the OD 256 of the contact surface 252 as described above so as to minimize displacement volume 260 and concentrate the remaining displacement volume 260 near OD 256. Conventional seal 120, having a large displacement volume 130 that is not advantageously concentrated near OD 126 of the contact surface 122 of seal 120, thus has a larger integrated cumulative displacement ratio. Thus, the integrated cumulative displacement ratio of a given seal generally declines as more of the displacement volume of the given seal is concentrated near the OD of the contact surface of the seal.

Figure 5:
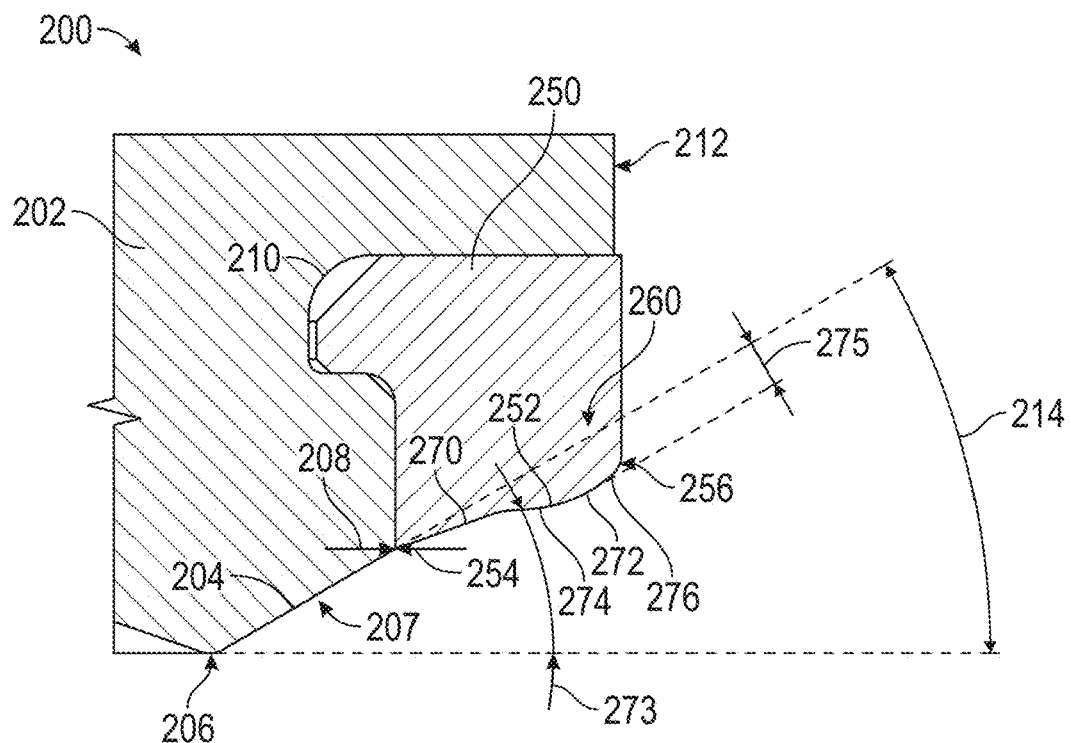
FIGS. 5 and 6 are zoomed-in cross-sectional views of the durable valve of FIG. 3.
Figure 6:
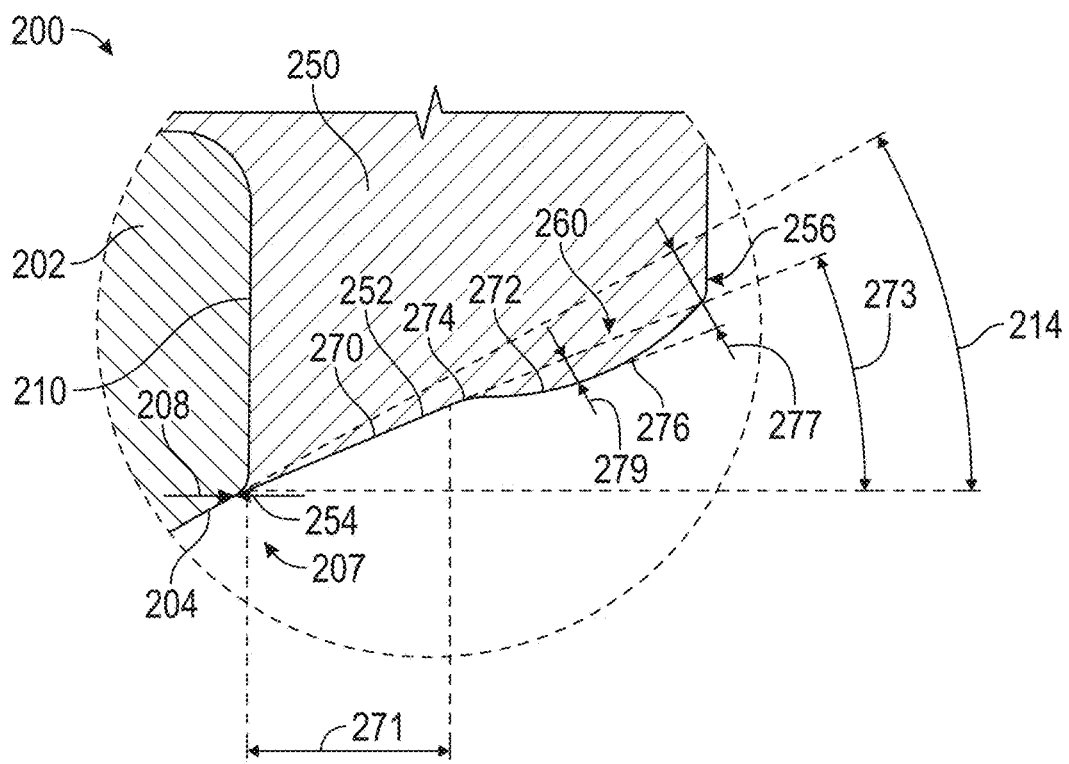

Referring now to FIGS. 5, 6, views of the durable seal 250 of durable valve 200 with the displacement volume 260 thereof in the rest position are shown. It may be understood that the description of durable seal 250 that follows in only exemplary and the geometry of durable seal 250 may vary in other embodiments. As shown by FIGS. 5, 6, the displacement volume 260 of seal 250 corresponds to the volume of seal 250 falling between the contact surface 252 and a projection of the strikeface 204 that extends radially outwards at an angle 214 to the horizontal (an axis extending normally from central axis 205).

In this exemplary embodiment, the contact surface 252 of seal 250 is formed from or contains several surfaces including a radially inner frustoconical surface 270, and a radially outer convex surface 272. Frustoconical surface 270 extends radially outwards from the ID 254 of contact surface 252 while the convex surface 272 extends radially inwards from the OD 256 of surface 252 such that surfaces 270 and 272 intersect at an annular, concave interface 274 located between the surfaces 270 and 272. The inner frustoconical surface 270 extends across an annular radius 271 between the ID 254 of contact surface 252 and the concave interface 274. In some embodiments, the annular radius 271 of inner frustoconical surface 270 is between approximately 30% and 60% of the total radius or radial width of durable seal 250; however, it may be understood that the size of annular radius 271 relative to the total radius of durable seal 250 may vary.

The inner frustoconical surface 270 of seal 250 may be planar and extend at a non-zero angle relative to the strikeface 204 of valve body 202. For example, strikeface 204 may extend at angle 214 relative to the horizontal while the frustoconical surface 270 extends at an angle 273 relative to the horizontal, where angle 273 is less than angle 214. In some embodiments, angle 214 is between approximately 30 degrees and 50 degrees from the horizontal, while angle 273 is between approximately 10 degrees and 30 degrees. In some embodiments, angle 273 is between approximately 5 degrees and 15 degrees less than angle 214. A relatively small difference between the angle 273 of frustoconical surface 270 and the angle 214 of strikeface 204 may minimize the amount of displacement volume 260 located near the ID 254 of contact surface 252 while still leaving some cushion near the ID 254 to prevent excessive wear to the strikeface 204 of valve body 202. However, it may also be understood that in other embodiments the magnitude of angles 214 and 273 as well as the magnitude of the difference between angles 214 and 273 may vary.

In this exemplary embodiment, the convex surface 272 of seal 250 is defined by an annular, bulb-shaped convex curve which projects outwardly and towards the seat surface 60 of valve seat 50. By bulging the contact surface 252 outwards near the OD 256 of contact surface 252, convex surface 272 assists in shifting the majority of the displacement volume 260 towards the OD 256 of surface 252 and away from the ID 254 thereof. In this configuration, a first distance or gap 275 is formed between the planar projection of the strikeface 204 of valve body 202 and a crest 276 of the convex surface 272. In some embodiments, the first gap 275 is between approximately 0.050 inches and 0.150 inches; however, the geometry of crest 276 and thus the magnitude of first gap 275 may vary in other embodiments.

A second distance or gap 277 (shown in FIG. 6) is formed between crest 276 and a projection of the frustoconical surface 270. Additionally, a third distance or gap 279 is formed between crest 276 and a projection of the strikeface 204. The second gap 277 is less than the third gap 279 given that the angle 214 between strikeface 204 and the horizontal is greater than the angle 273 formed between frustoconical surface 270 and the horizontal. In some embodiments, the second gap 277 is 50% or less of the magnitude of third gap 279. In some embodiments, the second gap 277 is 35% or less of the magnitude of third gap 279; however, it may be understood that the difference in magnitude between gaps 277 and 279 may vary.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve for a displacement pump, the valve comprising:
   a valve seat having an outer surface, a central passage defined by an inner surface, and a seating surface extending radially between the inner surface and the outer surface;
   a valve body having an annular strikeface and defining an annular receptacle; and
   an annular seal received in the receptacle of the valve body and having a first end and a longitudinally opposed second end, the seal comprising an annular exterior surface that includes a contact surface positioned along the second end of the annular seal;
   wherein the contact surface of the annular seal comprises an annular radially inner frustoconical surface extending radially outwards from an inner diameter of the contact surface at an incline directed towards the first end of the annular seal, and an annular radially outer convex surface that extends radially to an outer diameter of the contact surface to define the outer diameter of the contact surface;
   wherein the seal defines a cumulative displacement ratio of at least one of (i) at most 0.20 at a location that is spaced 40% from the inner diameter of the contact surface of the seal moving towards the outer diameter of the contact surface, (ii) at most 0.35 at a location that is spaced 55% from the inner diameter of the contact surface moving towards the outer diameter of the contact surface, and (iii) at most 0.45 at a location that is spaced 65% from the inner diameter of the contact surface moving towards the outer diameter of the contact surface;
   wherein the valve comprises an open state in which the contact surface of the annular seal is entirely spaced from the valve seat and a closed state in which the contact surface is in contact with the seating surface of the valve seat, and wherein the convex surface is the radially outermost portion of the annular seal that contacts the valve seat when the valve is in the closed state.

2. The valve of claim 1, wherein the seal defines the cumulative displacement ratio of at most 0.20 at the location that is spaced 40% from the inner diameter of the contact surface moving towards the outer diameter of the contact surface, at most 0.35 at the location that is spaced 55% from the inner diameter of the contact surface moving towards the outer diameter of the contact surface, and at most 0.45 at the location that is spaced 65% from the inner diameter of the contact surface moving towards the outer diameter of the contact surface.

3. The valve of claim 1, wherein the seal defines the cumulative displacement ratio of at most 0.30 at a location that is spaced 50% from the inner diameter of the contact surface moving towards the outer diameter of the contact surface.

4. The valve of claim 1, wherein the seal defines the cumulative displacement ratio of at most 0.35 at the location that is spaced 55% from the inner diameter of the contact surface moving towards the outer diameter of the contact surface.

5. The valve of claim 1, wherein the seal has an integrated cumulative displacement ratio of 0.31 or less.

6. The valve of claim 1, wherein the contact surface of the seal comprises the annular radially inner frustoconical surface extending radially outwards from the inner diameter of the contact surface, and an annular concave interface positioned between the frustoconical surface and the radially outer convex surface.

7. A displacement pump, comprising:
a fluid end housing defining a fluid chamber, a suction bore and a discharge bore;
a plunger configured to displace fluid through the fluid chamber of the fluid end housing;
a suction valve positioned in the suction bore and having an open position permitting fluid flow through the suction bore and a closed position restricting the fluid flow through the suction bore; and
a discharge valve positioned in the discharge bore and having an open position permitting fluid flow through the discharge bore and a closed position restricting the fluid flow through the discharge bore;
wherein one of the suction valve and the discharge valve comprises the valve of claim 1.

8. A valve for a displacement pump, the valve comprising:
a valve seat having an outer surface a central passage defined by an inner surface, and a seating surface extending radially between the inner surface and the outer surface;
a valve body having an annular strikeface and defining an annular receptacle; and
an annular seal received in the receptacle of the valve body and having a first end and a longitudinally opposed second end, the seal comprising an annular exterior surface that includes a contact surface positioned along the second end of the annular seal;
wherein the contact surface of the annular seal comprises an annular radially inner frustoconical surface extending radially outwards from an inner diameter of the contact surface at an incline directed towards the first end of the annular seal, and an annular radially outer convex surface that extends radially to an outer diameter of the contact surface to define the outer diameter of the contact surface;
wherein the seal has an integrated cumulative displacement ratio of 0.31 or less;
wherein the valve comprises an open state in which the contact surface of the annular seal is entirely spaced from the valve seat and a closed state in which the contact surface is in contact with the seating surface of the valve seat, and wherein the convex surface is the radially outermost portion of the annular seal that contacts the valve seat when the valve is in the closed state.

9. The valve of claim 8, wherein the integrated cumulative displacement ratio is 0.26 or less.

10. The valve of claim 8, wherein the integrated cumulative displacement ratio is 0.21 or less.

11. The valve of claim 8, wherein the seal defines a cumulative displacement ratio of at least one of (i) at most 0.20 at a location that is spaced 40% from the inner diameter of the contact surface of the seal moving towards the outer diameter of the contact surface, (ii) at most 0.35 at a location that is spaced 55% from the inner diameter of the contact surface moving towards the outer diameter of the contact surface, and (iii) at most 0.45 at a location that is spaced 65% from the inner diameter of the contact surface moving towards the outer diameter of the contact surface.

12. The valve of claim 11, wherein the seal defines the cumulative displacement ratio of at most 0.20 at the location that is spaced 40% from the inner diameter of the contact surface moving towards the outer diameter of the contact surface, at most 0.35 at the location that is spaced 55% from the inner diameter of the contact surface moving towards the outer diameter of the contact surface, and at most 0.45 at the location that is spaced 65% from the inner diameter of the contact surface moving towards the outer diameter of the contact surface.

13. The valve of claim 8, wherein the contact surface of the seal comprises the annular radially inner frustoconical surface extending radially outwards from the inner diameter of the contact surface, and an annular concave interface positioned between the frustoconical surface and the radially outer convex surface.

14. A displacement pump, comprising:
a fluid end housing defining a fluid chamber, a suction bore and a discharge bore;
a plunger configured to displace fluid through the fluid chamber of the fluid end housing;
a suction valve positioned in the suction bore and having an open position permitting fluid flow through the suction bore and a closed position restricting the fluid flow through the suction bore; and
a discharge valve positioned in the discharge bore and having an open position permitting fluid flow through the discharge bore and a closed position restricting the fluid flow through the discharge bore;
wherein one of the suction valve and the discharge valve comprises the valve of claim 8.

15. A valve for a displacement pump, the valve comprising:
a valve seat having an outer surface, a central passage defined by an inner surface, and a seating surface extending radially between the inner surface and the outer surface;
a valve body having an annular strikeface and defining an annular receptacle; and
an annular seal received in the receptacle of the valve body and having a longitudinal axis, a first end, and a longitudinally opposed second end, the seal comprising an annular exterior surface that includes a radially outer surface extending between the first end and the second end, and a contact surface positioned along the second end of the annular seal;
wherein the contact surface of the seal extends between an inner diameter and an outer diameter from which the radially outer surface directly extends in a direction substantially parallel with the longitudinal axis and which comprises an annular radially inner frustoconical surface extending radially outwards from the inner diameter of the contact surface at an incline directed towards the first end of the annular seal, a radially outer annular convex surface extending radially outwards to the outer diameter of the contact surface to define the outer diameter of the contact surface, and an annular concave interface positioned between the frustoconical surface and the radially outer convex surface;
wherein the valve comprises an open state in which the contact surface of the annular seal is entirely spaced from the valve seat and a closed state in which the contact surface is in contact with the seating surface of the valve seat, and wherein the convex surface is the radially outermost portion of the annular seal that contacts the valve seat when the valve is in the closed state.

16. The valve of claim 15, wherein the strikeface of the valve body extends at a first angle to a horizontal that extends normally relative to a central axis of the valve, and the frustoconical surface extends at a second angle from the horizontal that is less than the first angle.

17. The valve of claim 15, wherein the seal defines a cumulative displacement ratio of at least one of (i) at most 0.20 at a location that is spaced 40% from the inner diameter of the contact surface of the seal moving towards the outer diameter of the contact surface, (ii) at most 0.35 at a location that is spaced 55% from the inner diameter of the contact surface moving towards the outer diameter of the contact surface, and (iii) at most 0.45 at a location that is spaced 65% from the inner diameter of the contact surface moving towards the outer diameter of the contact surface.

18. The valve of claim 17, wherein the seal defines the cumulative displacement ratio of at most 0.20 at the location that is spaced 40% from the inner diameter of the contact surface moving towards the outer diameter of the contact surface, at most 0.35 at the location that is spaced 55% from the inner diameter of the contact surface moving towards the outer diameter of the contact surface, and at most 0.45 at the location that is spaced 65% from the inner diameter of the contact surface moving towards the outer diameter of the contact surface.

19. The valve of claim 15, wherein the seal has an integrated cumulative displacement ratio of 0.31 or less.

20. A displacement pump, comprising:
a fluid end housing defining a fluid chamber, a suction bore and a discharge bore;
a plunger configured to displace fluid through the fluid chamber of the fluid end housing;
a suction valve positioned in the suction bore and having an open position permitting fluid flow through the suction bore and a closed position restricting the fluid flow through the suction bore; and
a discharge valve positioned in the discharge bore and having an open position permitting fluid flow through the discharge bore and a closed position restricting the fluid flow through the discharge bore;
wherein one of the suction valve and the discharge valve comprises the valve of claim 15.

* * * * *